United States Patent [19]
Denton

[11] Patent Number: 5,804,133
[45] Date of Patent: Sep. 8, 1998

[54] MOTORIZED CUTTING TORCH ATTACHMENT

[76] Inventor: Daniel Webster Denton, P.O. Box 87, Boling, Tex. 77420

[21] Appl. No.: 677,586

[22] Filed: Jul. 9, 1996

Related U.S. Application Data

[63] Continuation-in-part of Ser. No. 670,172, Jun. 27, 1996, and Ser. No. 636,316, Apr. 23, 1996, abandoned.

[51] Int. Cl.[6] ...................................................... B23K 7/10
[52] U.S. Cl. ................................................ 266/66; 266/70
[58] Field of Search .................................. 264/48, 66, 70

[56] References Cited

U.S. PATENT DOCUMENTS

| | | | |
|---|---|---|---|
| 2,886,305 | 5/1959 | Strahan | 266/66 |
| 3,071,361 | 1/1963 | Jacobs | 266/66 |
| 3,698,701 | 10/1972 | Straub | 266/66 |
| 4,469,311 | 9/1984 | Laing | 266/70 |
| 4,606,528 | 8/1986 | Zwicker | 266/70 |
| 4,669,311 | 6/1987 | Zwicker | 266/66 |

*Primary Examiner*—Scott Kastler
*Attorney, Agent, or Firm*—Michael B. Jolly

[57] ABSTRACT

A cutting torch drive attachment which is easily attachable to an existing cutting torch providing a self contained battery powered motorized cutting torch drive attachment facilitating consistent torch speed and tip to work distance resulting in smooth straight line and circular metal cutting with improved torch gas usage efficiency.

42 Claims, 8 Drawing Sheets

MOTORIZED CUTTING TORCH ATTACHMENT

RELATED APPLICATIONS

The present application is a continuation-in-part of U.S. patent application 08/670,172, executed on Jun. 27, 1996 and filed on or about Jul. 1, 1996 entitled "Motorized Cutting Torch Attachment" and continues from U.S. patent application Ser. No. 08/636,316, filed Apr. 23, 1996, entitled "Motorized Cutting Torch Attachment", now abandoned.

BACKGROUND OF THE INVENTION

This invention relates to a cutting torch attachment and more particularly to a battery powered motorized drive attachment for a cutting torch which facilitates smoother cutting. It is well known that free hand gas cutting torch operation produces a cut metal surface which is very rough and inconsistent requiring grinding and other work to finish the cut metal surface. The present invention is a self contained battery powered cutting torch drive attachment providing consistent torch speed and torch tip to work distance facilitating rapid smooth metal cutting with improved torch gas usage efficiency.

Prior devices have been developed which incorporated a drive motor within a cutting torch as in U.S. Pat. Nos. 4,606,528 and 4,469,311. These devices provide a torch with improved cutting characteristics as the present invention, however they do not provide an attachment which can be quickly and easily attached to an existing cutting torch. The present invention will easily and quickly attach to an existing cutting torch while also a providing a drive for such torch which may be quickly adapted for circular cutting.

SUMMARY OF THE INVENTION

It is accordingly an object of the present invention to provide a cutting torch drive attachment which is easily attachable to a cutting torch providing a self contained battery operated torch drive motor to accomplish smooth consistent metal cutting.

It is a further object of the invention to provide a cutting torch drive attachment which maintains a consistent torch to work distance and a consistent torch speed facilitating smooth metal cutting.

It is another object of the present invention to provide a cutting torch drive attachment which can be adjusted to fit on most gas cutting torches, which uses self contained battery power, and which has a multi speed drive motor and reversible drive direction.

It is another object of the present invention to provide a cutting torch drive attachment which can be easily adapted to perform straight line and circular cutting.

DETAILED DESCRIPTION OF THE DRAWINGS

Figure 1:
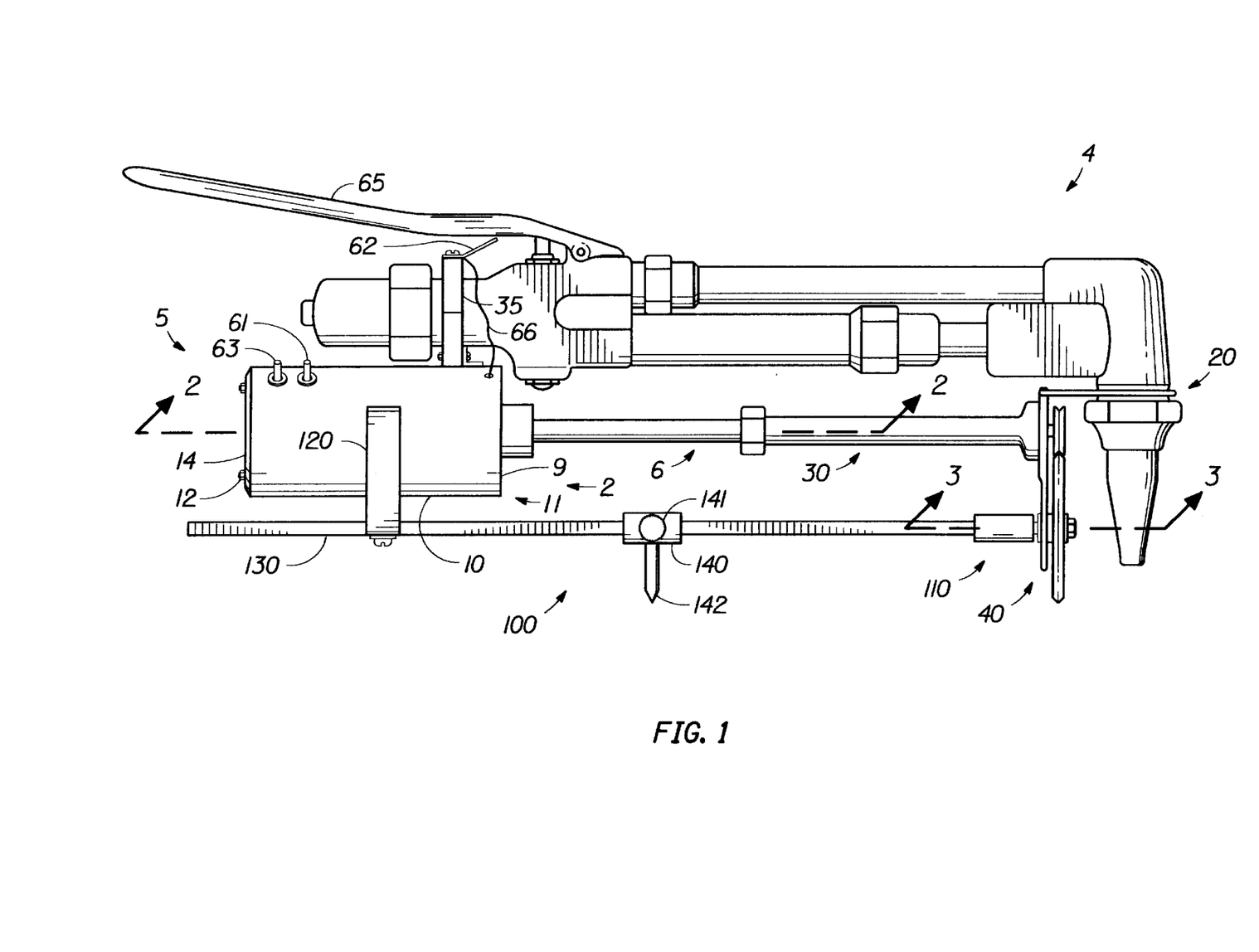
FIG. 1 is a perspective view of the motorized cutting torch attachment attached to a cutting torch equipped with the circle cutting attachment.

Referring to the drawings the motorized cutting torch drive attachment 2 according to the invention is illustrated generally in FIG. 1 attached to a cutting torch 3. The torch drive 2 has a front 4, rear 5 and top 6. The front 4 has positioned the front mounting means 20 and drive wheel assembly 40. The rear 5 of the torch drive 2 includes the drive motor body housing 10, electrical circuitry 60 and rear mounting means 35. The rear 5 and front 4 are coupled with the drive shaft assemble 30.

Figures 2, 2A:
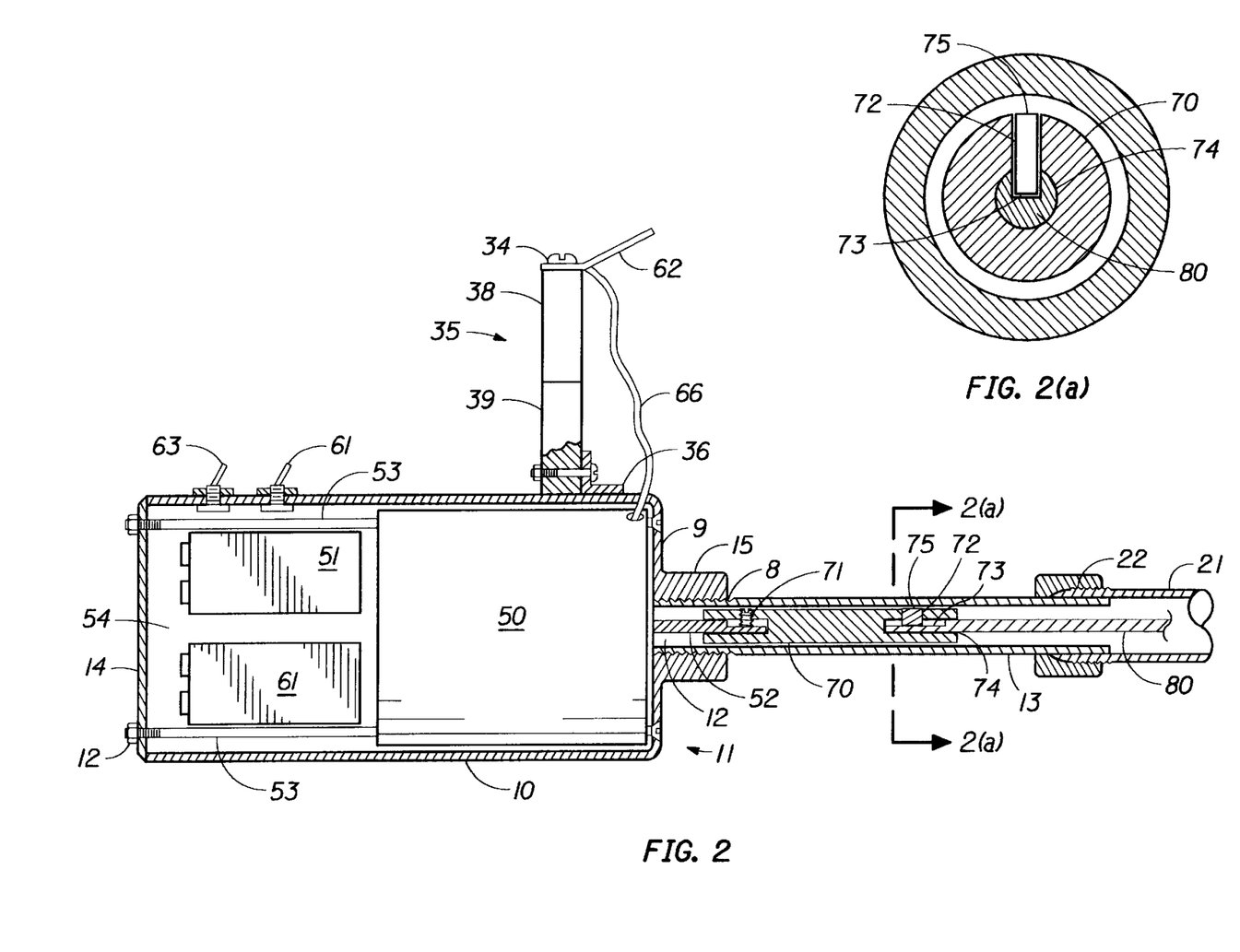
FIG. 2 is a cut away view of the invention illustrating the motor assembly and drive shaft along line I of FIG. 1.
FIG. 2a is a cross sectional view of the shaft coupler and extendable shaft taken along line II of FIG. 2.
Figure 4:
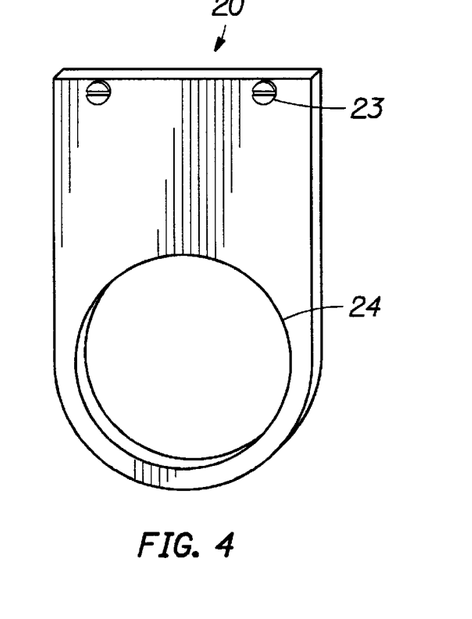
FIG. 4 is a top view of the front mount of the motorized cutting torch attachment.
Figure 4A:
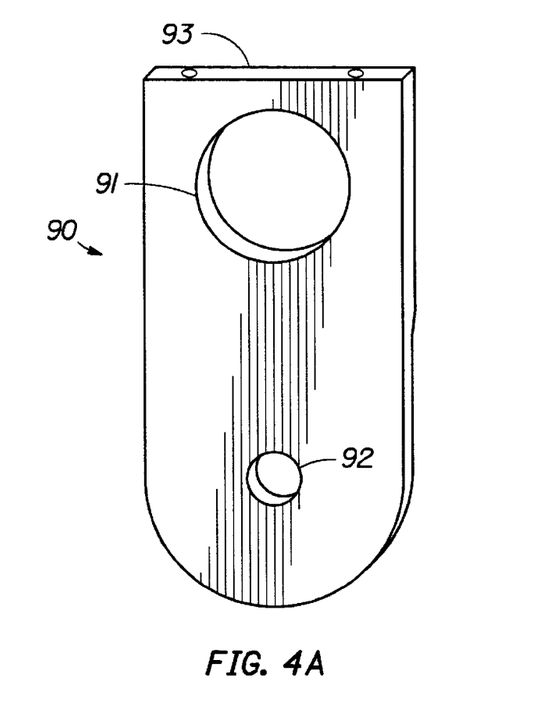
FIG. 4a is a front view of the drive wheel bracket.
Figure 4B:
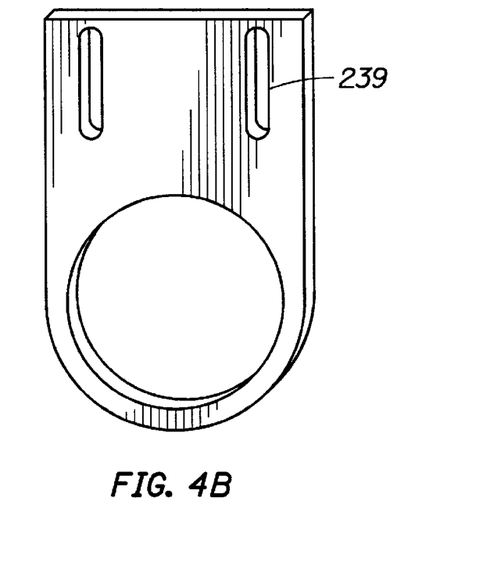
FIG. 4b is a top view of a front mount of the motorized cutting torch attachment illustrating slotted mounting screw apertures.
Figure 4C:
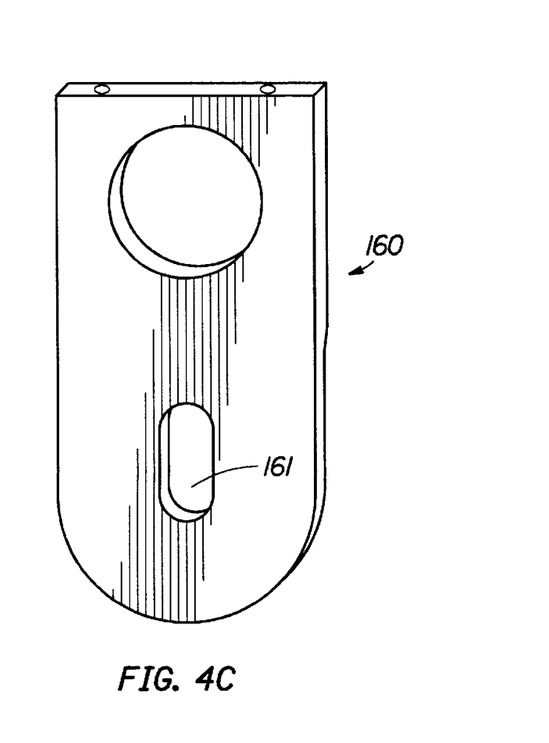
FIG. 4c is a front view of a slotted drive wheel bracket.

The torch drive 2 is battery powered by a low ampere DC motor 50. The motor 50, batteries 51, and electrical circuitry 60 are contained within a cylindrical body housing 10 which body housing 10 is constructed of aluminum or other durable material. The body housing 10 has a front 11 and rear 12. The body housing front 11 has circular plate 9 with a centrally located aperture 12 serving as an exit for motor shaft 52, the circular plate 9 is further dimensioned to correspond to body housing 10 diameter and further is permanently affixed to the front 9 of body housing 10 by welding or some other permanent means. Circular plate 9 and body housing 10 may also be constructed of one piece material and shaped to dimension by either machining or a molding process. The rear of the body housing 10 is fitted with detachable circular cover 14. The cylindrical body housing 10 along with the circular front plate 9 form a body cavity 54 for receiving the motor 50, batteries 51, and electrical circuitry 60. The inside diameter of the body housing cavity 54 is dimensioned to receive the motor 50 with minimal clearance between the motor 50 and body housing 10. The length of the body housing 10 is dimensioned to receive the motor 50 and the length of batteries 51 with additional space for packing electrical circuitry 60. A means may also be provided for securely packing the batteries 51 and electrical circuitry 60 into body cavity 54, such as a foam or plastic formed insertion dimensioned to snugly packed cavity 54. Detachable cover 14 and motor 50 are secured utilizing screws 53 which run through the body housing 10 from the body housing front circular plate 9 to the detachable cover 14. Circular cover 14 may also be attached to housing 10 by threading the cover 14 into cylindrical housing 10 or clipping cover 14 into place upon housing 10. Shaft housing 13 is centrally affixed by use of threads 8 to the front circular plate 9 about front housing threaded shoulder 15. Shaft housing 13 serves as a housing for the motor shaft 52 and shaft coupler 70. The shaft housing 13 is extended by a extendable shaft housing 21 said extendable shaft housing 21 having one end with a compression fitting 22 for securing the position of shaft housing 13 within extendable shaft housing 31. The other end of the extendable shaft housing 21 serves as both a connecting point for the front mounting means 20 and an exit for extendable shaft 80. It may be desirable to construct the shaft housing of one piece material if the apparatus is intended to be applied to only one size of cutting torch thereby dispensing with the need to have a length extendable housing and shaft assemble. Additionally, the one piece shaft housing would be desirable if a alternative method of extending the apparatus were employed such as the use of a front mount with slotted mounting screw apertures as illustrated in FIG. 4b.

Motor shaft 52 is coupled to extendable shaft 80 utilizing shaft coupler 70. Coupler 70 receives motor shaft 52 and is fixedly secured to said motor shaft 52 by use of set screw 71. Coupler 70 has a central extendable shaft receiving bore 74 which is dimensioned to slidingly receive said extendable shaft 80. Coupler 70 is further equipped with key way 72 for receiving said key 75, said key 75 further engages extendable shaft 80 by engaging with an extendable shaft key way 73. The purpose of the coupler 70 is to provide a stable connection between motor shaft 52 and the coupler 70 and an extendable stable connection between coupler 70 and extendable shaft 80. The use of this type of shaft-extendable shaft coupler connection enables the extendable shaft 80 to be positively positioned within the coupler receiving area 81 at a desired depth thereby allowing the tool to be extended by extending the shaft 80 and extendable shaft housing 21 facilitating use of the tool on cutting torches with different dimensions since the tool may need to be elongated in order to install it upon different manufacturers cutting torches. Other means may be employed which accomplish this goal and may be employed as long as the shafts' connection remains true upon shaft rotation. This is especially important in light of the use of a drive motor 50 with low ampere requirement. As mentioned extendable housing 21 along with compression fitting 22 and the extendable shaft means 80 enables the tool to be extended or retracted in length thereby facilitating the tools use upon cutting torches of varying dimensions. It is contemplated that the overall tool length adjustment will be approximately one-half inch. Other means may be employed to increase the overall length adjustment however, it has been found that most cutting torches can be accommodated with this length adjustment. As mentioned above it may be desirable to construct the tool without an extendable shaft housing assembly, this would also obviate the need to construct an extendable shaft assembly. The nonextendable shaft could be constructed with a motor shaft coupler and shaft which is not slidable coupled to said coupler but statically set in place.

Figure 3:
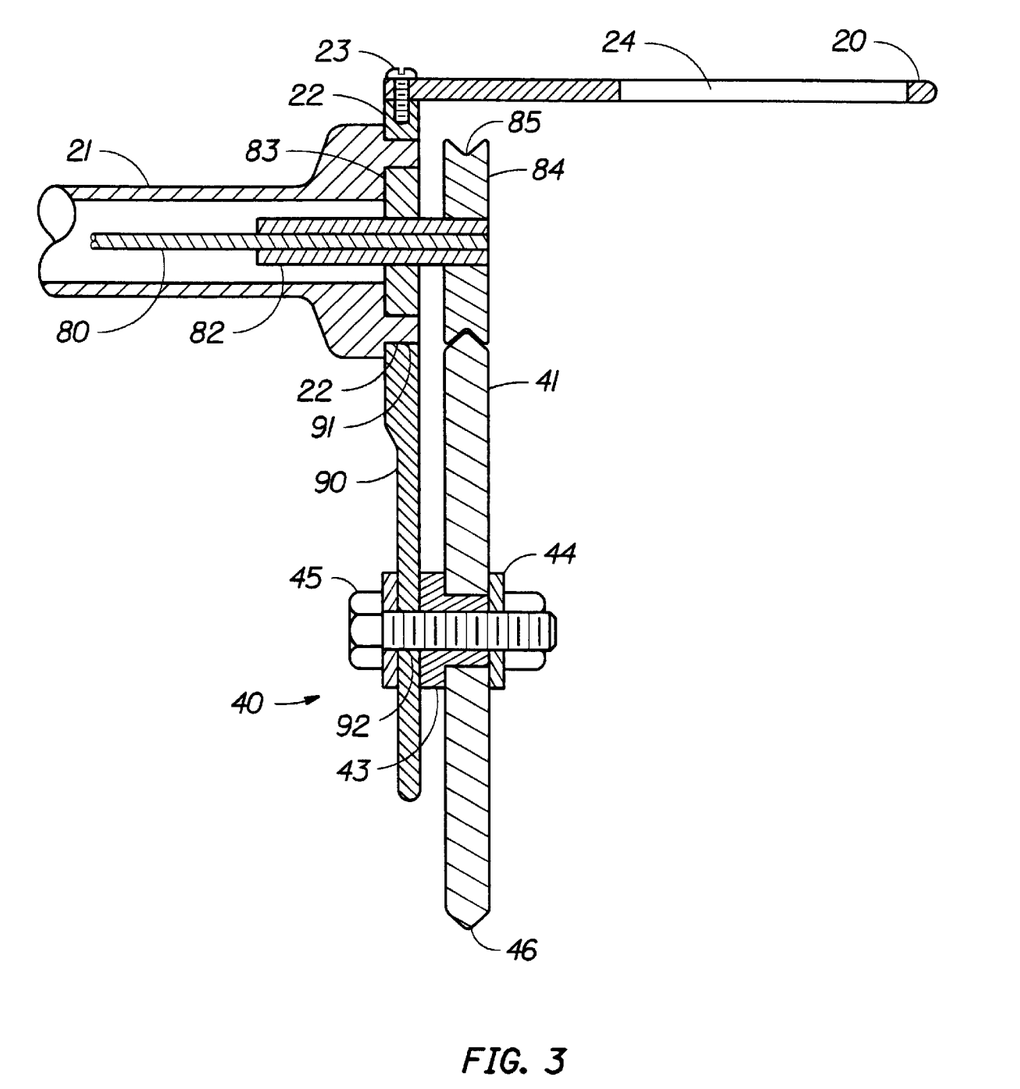
FIG. 3 is a cut away view of the invention illustrating the drive wheel assembly along line III of FIG. 1.
Figure 3A:
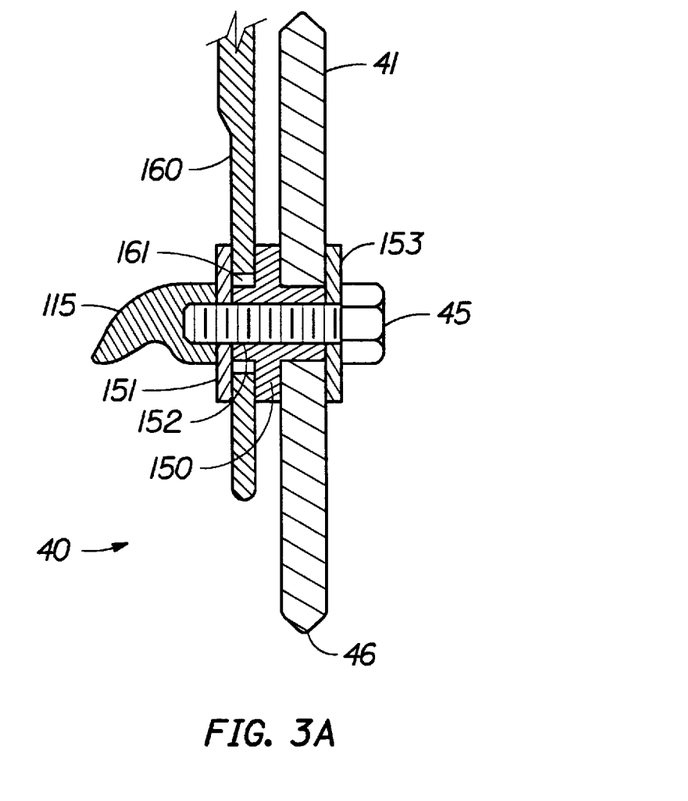
FIG. 3a is a cross sectional view taken along line III of FIG. 1 illustrating the self adjusting drive wheel assembly.
Figure 3B:
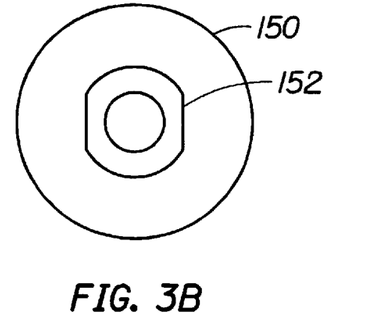
FIG. 3b is an end view of the drive wheel mounting double shouldered bushing illustrating the squared trunion which floats in the slotted drive wheel bracket.
Figure 3C:
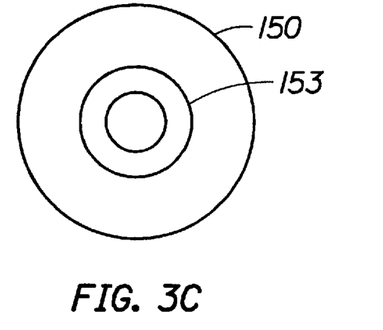
FIG. 3c is and end view of the drive wheel mounting double shouldered bushing illustrating the rounded trunion which rotationally receives the drive wheel.

Front mount 20 is connected to the front end of extendable shaft housing 21. Additionally, extendable shaft 80 exits extendable housing 21 by use of a shaft stub 82 which is dimensioned to be lightly pressed upon the end of extendable shaft 80. The end of extendable housing 21 also receives bearing 83 which supports shaft stub 82 and extendable shaft 80. Engagement wheel 84 is fixedly secured upon shaft stub 82, said engagement grove 85 acting as a frictional engagement area for drive wheel 41. Extendable housing 21 has a circular drive mounting plate receiving area 22 for pressingly receiving drive wheel mounting plate 90 through mounting plate aperture 91. Receiving area 22 and aperture 91 are dimensioned to be a press fit or a snug fit and further secured with adhesives or welding. The mounting plate 90 also has a drive wheel mounting aperture 92. The drive wheel 41 is most preferable constructed of stainless steel or some other equally hard metal and has a central mounting aperture 42 so the drive wheel can be rotationally mounted upon mounting plate 90 through mounting aperture 92. The distance from drive wheel mounting aperture 92 and mounting plate aperture 91 should correspond to the radius of the engagement wheel 84 and the drive wheel 41 and support the cutting torch tip a desirable distance above the work. It is also desirable to construct the drive wheel 41 of a nonmagnetic material so that small magnetized metal particles are not attracted to the drive wheel 41 as a cutting job is performed. A shouldered brass bushing 43 and a brass washer 44 allow the drive wheel 41 to be secured in position upon mounting plate 90 through aperture 92 by bolt and nut 45 while also remaining in free rotation. The drive wheel 41 circumference is double beveled forming a frictional drive wheel engagement area 46 around the perimeter of drive wheel 41 acting as a frictional engagement means with engagement groove 85. Drive wheel 41 and engagement wheel 84 should have a radius which, when the drive motor is operating, provides a drive tool speed appropriate for cutting the desired metal and corresponding cutting torch tip size. Central mounting aperture 42 and shouldered brass bushing 43 are dimensioned so that the drive wheel 41 is loosely secured upon the brass bushings 43 and 44 after the mounting bolt 45 is tightened. The drive wheel 41 slack should be approximately three to twelve thousands of an inch and further the drive wheel 41 should be positioned so that the drive wheel 41 engages with engagement wheel 84 when the drive wheel 41 is pushed towards the engagement wheel 84. The drive wheel 41 slack results in the drive wheel 41 to not be engaged unless it is urged towards the engagement wheel 84, when pressure is not applied to the drive wheel 41 towards the engagement wheel 84 the engagement wheel 84 rotates freely. When the drive wheel 41 is placed upon a working surface and moderate pressure, approximately the weight of the cutting torch and drive tool, the drive wheel 41 is moved towards the engagement groove 85 engaging the drive wheel 41 with the engagement wheel 84 thus resulting in drive wheel 41 rotation and torch movement. Frictional engagement of the drive 41 and engagement wheel 84 should occur when drive wheel 41 has been urged towards the engagement wheel 84 with slack remaining in the drive wheel 41. The inventor has found that use of a drive wheel 41 with clearance as described, allows for the use of a low ampere drive motor and resulting longer battery life.

The drive wheel 41 may alternatively and preferable be mounted as a self adjusting floating drive wheel utilizing a double shouldered trunion bushing 150 and slotted drive wheel bracket aperture 161. The double shoulder bushing has a squared trunion 152 for disposition within said slotted bracket aperture 161, which said squared trunion 152 prevents double shouldered bushing 150 rotation after mounting, and a rounded trunion 153 for disposition within said drive wheel central aperture 42 said rounded trunion 153 being demensioned so that the drive wheel 41 rotates freely upon said rounded trunion 153. Slotted mounting aperture 161 is deminsioned to recieve said squared trunion 152 and slotted so that the double shouldered bushing moves about one quarter inch within said slotted mounting aperture 161. The drive wheel 41 and drive wheel bracket 160 are sandwiched between the double shouldered bushing 150 and brass bushings 151 and held in place by a bolt 45 which travels centrally through the bushings 151 and the double shouldered bushing 150 and said bolt 45 secured into threaded front circle cut attachment 115. The doubled shouldered bushing 150 should be dimensioned so that after bolt 45 is tightened in place, the squared trunion 152 freely moves in the slotted aperture 161 upon said bracket 160 without rotating and the drive wheel 41 rotates freely upon said rounded trunion 153 while also traveling with said doubled shouldered bushing 150 as said bushing 150 floats within slot 161. This floating drive wheel assembly allows the drive wheel 41 to engage with engagement wheel 84 when the drive wheel is urged towards the engagent wheel, such as when the drive wheel is place on metal to be cut with the weight of the cutting torch. The inventor has found that this floating drive wheel mounting means is most preferable because when the drive attachment is continually used heat buildup expands the drive wheel 41 and its mounting brackets resulting in inconsistent drive wheel operation, the floating mounting means provides a means for self adjusting the drive wheel as conditions change.

Figure 6:
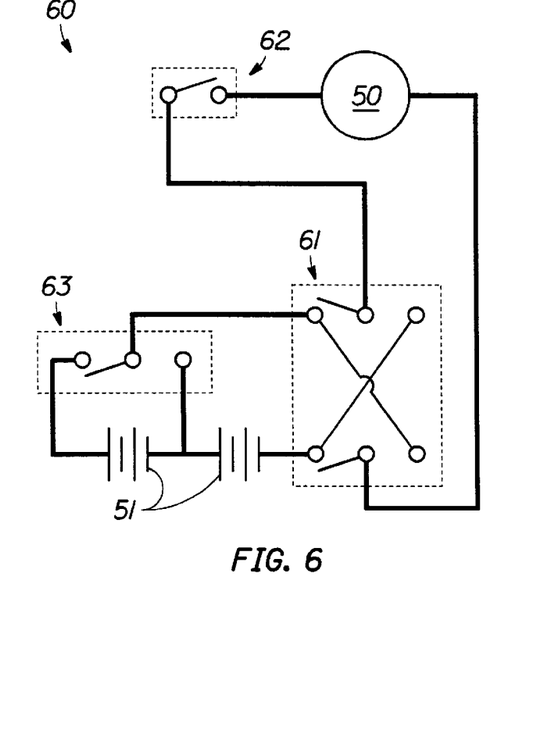
FIG. 6 is a schematic of the electrical circuitry of the motorized cutting torch attachment.

Drive motor 50 is most preferably a low ampere (between 2.0 and 15 milliampere) direct current 12 volt and powered by two 9 volt batteries 51 and most preferable fitted with a reduction gear so that the motor drive shaft rotates at a speed which results in drive wheel 41 rotation and subsequent torch movement at a desired speed. It is highly desirable to use a low ampere motor in order to prolong battery life. The present invention utilizes a 2.5 milliampere motor which draws a maximum of 12 milliampere at full load. Other motors are contemplated with varying power requirements however, a goal of the present invention is to provide a tool which requires minimal maintenance and battery replacement A problem encountered while developing this tool with the use of the low ampere motor was that the motor did not have the torque necessary to drive the torch. Prior devices utilized a drive motor which plugged into a wall socket. This problem was over come by the development and use of the drive wheel mechanism 40 described above which results in minimal drive train drag and motor draw. The use of the two batteries 51 enables the drive unit to be equipped with a low and high speed. High/low speed switch 63 switches the power source to drive motor 50 from either one battery 51 or both batteries 51. The torch drive unit is also most preferably equipped with a reverse/forward switch 61 so that the tool can drive the cutting torch in a selected direction. Both switches 63 and 61 should be positioned to prevent inadvertent activation. Run switch 62 is a grounding switch which contacts cutting torch gas valve lever 65 when the gas valve lever 65 is depressed. Run switch 62 is further mounted upon rear mount 35 and positioned so that it does not contact lever 65 until lever is depressed, additionally switch 62 is constructed of electrically conducting material which retains it positioned after application of force associated with lever 65 contact. Switch 62 is connected to circuitry utilizing wire lead 66.

Figure 6A:
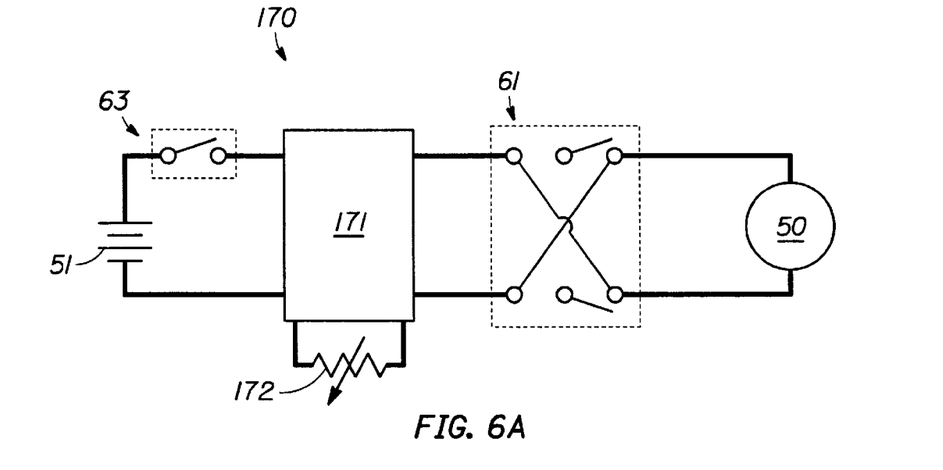
FIG. 6a is a schematic of the electrical circuitry illustrating the variable motor speed control of the cutting torch attachment.

Alternatively and preferably the appartus circuitry includes a means for variably controlling motor speed which also utilizes the entire power supply (both batteries) at all speed settings and minimal power loss and battery drain through the circuitry. FIG. 6a illustrates a pulse width modulation switching circuit 170 to control motor speed the circuitry utilizes a 555 CMOS timer, pulse width modulator 171, and a variable speed control switch 172.

Figure 5:
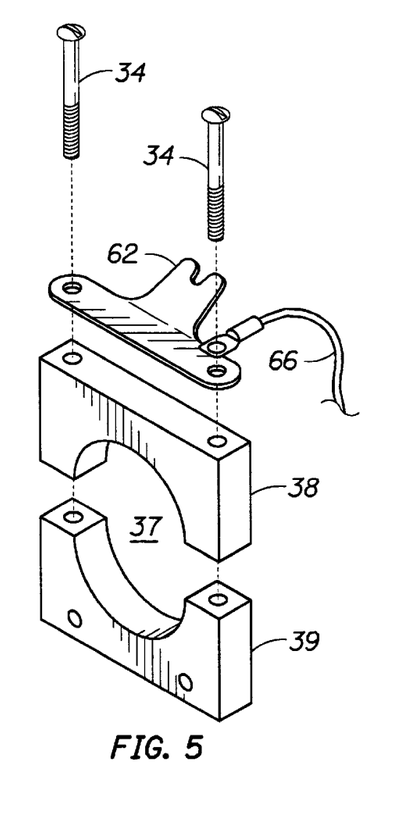
FIG. 5 is a rear view of the rear mount of the motorized cutting torch attachment.

Torch drive rear mount 35 is attached to the torch body housing 10 upon rear mount bracket 36. Rear mount 35 is constructed of a top piece 38 and bottom piece 39 both being constructed of non-electrically conducting material and dimensioned to form an aperture 37 which receives the cutting torch neck and is clamped by use of two clamping screws 34 which screws go through the top half 38 of rear mount 35 and screw into bottom half 39 of rear mount 35. Both clamping screws 34 also secure switch 62 in place, while one clamping screw secures electrical lead 66 in electrical contact with switch 62. In order for switch 62 to operate correctly it must be attached to non-electrical conducting material or be insulated from contact with the torch and the torch drive, the use of a non-electrical conducting material for the rear mount 35 accomplishes this. The use of a two part clamping rear mount 35 also allows for the placement of the torch drive upon torches with varying neck diameters. Other rear mounting means are contemplated such as a band or strap mount however, it is the intent of the inventor that this torch drive attachment be attachable to most cutting torches sold today and the rear mounting means 35 and the extensible shaft housing 30 and drive shaft coupler 70 as described above along with the forthcoming front mounting means 20 description are meant to operate together to accomplish the intent and purpose of this invention.

Front mount 20 is attached upon the top of the drive wheel mounting plate 93 by the use of two screws 23. The front mount 20 is constructed substantially flat with a torch head mounting aperture 24 said aperture 24 having a diameter that corresponds to the torch head diameter. It is contemplated that the torch head aperture 24 will be dimensioned to receive most cutting torch head sizes, however cutting torch head diameter can be matched by the use of a different front mount 20 with varying torch head aperture 24 sizes. Front mount 20 is installed after the cutting torch tip is removed and is secured upon the torch head by reapplication of the torch tip. Alternatively, the front mount may also have elongated mounting screw apertures 23a which would allow the front mount to be slidingly mounted to the drive wheel mounting plate 93 and secured in position by tightening mounting screws 23. The elongated screw apertures 23a would allow for incremental elongation of the tool and mounting said tool upon torches of varying length. Also, the slidingly mounted front mount could be the sole means of elongating the tool thus dispensing the need for the extendable shaft housing and extendable shaft assemblies.

Figure 7:
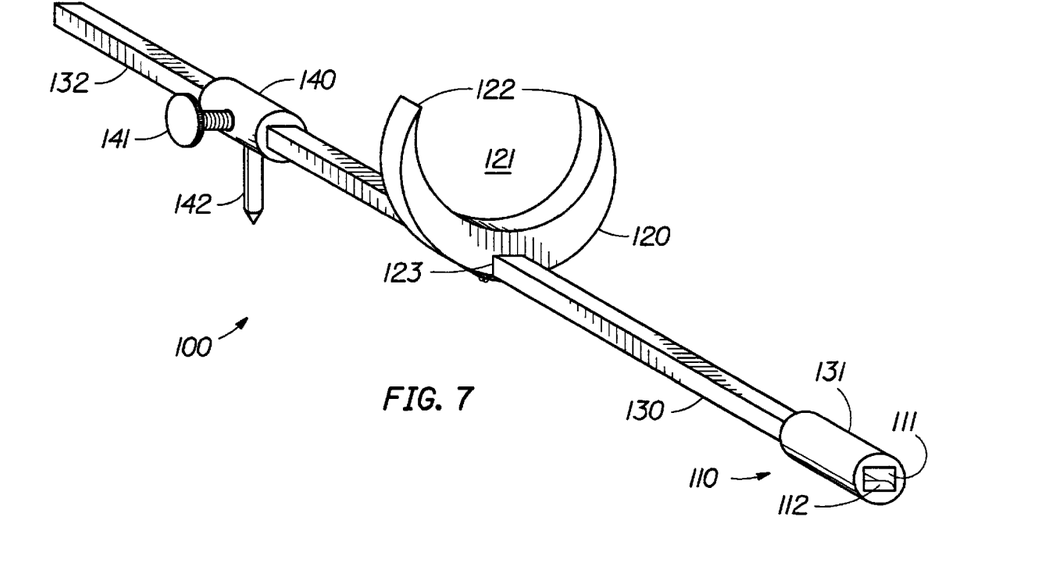
FIG. 7 is perspective view of the circle cutting attachment.
Figure 8:
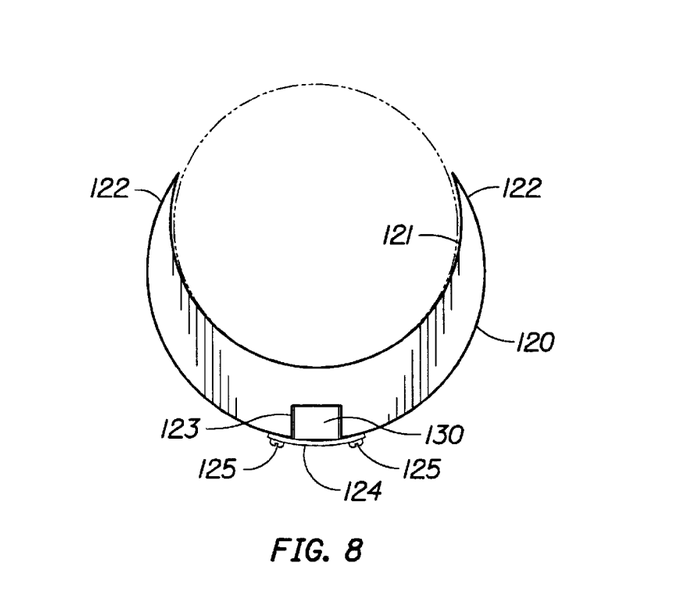
FIG. 8 is an end view of the circle cutting attachment rear mount.
Figure 9:
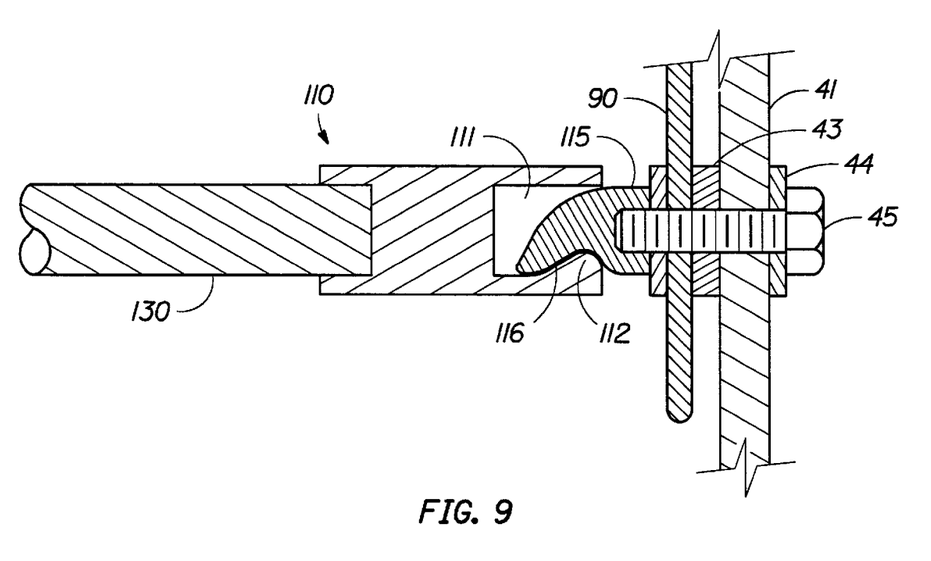
FIG. 9 is a cross sectional view of the circle attachment front mount taken along line IV of FIG. 1.

A circular cutting attachment 100 as shown in FIG. 7 can be easily attached to the apparatus and allow for adaption of the tool for circular cutting. The circular cutting attachment 100 is attached to the drive tool by a front engaging coupler 110 and a rear clip mount 120. The circular cutting attachment 100 is constructed with a square metal stock member 130, said member having a front end 131 and a rear end 132, the front end 131 having disposed the front engaging coupler 110 while the rear end 132 slidingly receives the biased rear clip 120, the square stock member 130 further being about ⅜ inch square mild steel and between about 1 foot to about 3 feet long. A slidable pivot point carrier 140 is disposed upon said square member 130 and said carrier 140 being locked in position upon the square member 130 by use of thumb set screw 141 which frictionally contacts square stock member 130. Further said carrier 140 having a pivot point 142 fixidely attached to said carrier 140. Said pivot point 142 acting as a point of rotation around which the cutting torch tip is driven by said torch driving tool. The pivot point 142 is most preferable dimensioned as a center punch, with a sharpened point to provide positive positioning of the tool as it rotates. It is contemplated that a user will "punch" a point on the work piece representing the center of the hole or arch desired to be cut, the punched point will provide the pivot point for the tool and location for pivot point 142 to rotate. The pivot point 142 may be constructed of magnetic material providing a fixed magnetic pivot point, or a rod inserted into a pre-drilled pivot hole. The front engaging coupler 110 is cylindrical in shape and fixedly attached to the front end 131 of said square member 130. Engaging coupler 110 has a centrally disposed receiving bore 111 for receiving a male engaging member 115, the receiving bore 111 has an internal locking cog 112 which engages with a cog indention 116, said cog indention 116 being disposed upon said male engaging member 115. The male engaging member 115 is fixedly attached to the drive wheel bracket 90 by threading said male engaging member upon the bolt 45 which secures said drive wheel 41 and drive wheel bushings 43, 44. The male engaging member 115 thus takes the place of the drive wheel bushing nut and doubles as an engaging mounting member for the circular cutting attachment. The rear biased "C" clip 120 is constructed of resilient material, most preferably metal or suitable material such as the plastic "nylatron". FIG. 7 and 8 illustrate a rear clip mount 120 constructed of "nylatron", in a general shape of a C. The clip inner area 121 serves as a receiving area for the tool body 10 while the ends of the clip 122 are biased to retain the clip upon the tool body 10. The clip 120 is slidingly attached to the square member 130 within a square trough 123 in the C clip 120, and further secured by strap 124 secured with screws 125 within said C clip 120. The square trough 123 is dimensioned to tightly receive said square member 130 so that moderate force is required to slide the C clip 120 along the square member 130. It is necessary that the C clip 120 slidingly attached to the square member 130 so that the pivot point carrier 140 may be placed in any position on the square member without impeding the rear mounting C clip 120. The square member 130 may be constructed of round stock, however square stock has been found to result in a more stable connection for the rear C clip mount and the pivot point carrier 140. Furthermore, the square member 130 may also have graduations along one edge for its length for determining the radius or diameter of the circle to be cut. Positioning the carrier 140 at a setting according to the graduations on the square member 130 would result in a certain size circle to be cut. The circle cutting attachment 100 is attached be inserting the front mounting coupler 110 onto the male engagement member 115 and swinging the attachment while holding the coupler 110 and male engagement member 115 together until the C clip inner area 121 contacts the tool body 10 and further forcing the C clip biased legs 122 around the tool body thereby clipping the attachment 100 upon the tool body 10. At this point the pivot point carrier 140 can be adjusted to the desired circle diameter.

When the drive tool is installed upon a cutting torch it is activated by depressing the torch gas lever 65. The drive tool works best when light pressure is applied upon the drive wheel mechanism, this pressure should correspond approximately to the weight of the torch and the drive tool. If too much weight is applied to the tool the drive wheel engagement means 85 and 46 will slip resulting in no drive effect.

I claim:

1. A cutting torch drive apparatus, comprising:
a) a drive motor,
b) a drive wheel mounted for rotation about its center upon a floating drive wheel mounting means,
c) a means engaging said drive wheel to said drive motor, said engaging means providing frictional engagement of the drive wheel with the drive motor,
d) a means powering said drive motor, and
e) means mounting said apparatus to said cutting torch.

2. Apparatus as set forth in claim 1 wherein said drive motor further comprises a direct current battery powered 2.0 to 15 milliampere single motor shaft motor.

3. Apparatus as set forth in claim 1 wherein said drive motor includes a 10 to 16 volt direct current single shaft drive motor.

4. Apparatus as set forth in claim 1 wherein said cutting torch drive apparatus further comprises a cylindrical body housing having a body housing cavity, said cavity receiving said drive motor and said powering means.

5. Apparatus as set forth in claim 1 wherein said cutting torch drive apparatus further comprises an extendable drive motor to drive wheel engagement means and an extendable engagement means housing, said extendable housing and extendable engagement means providing a means for extending the overall length of the torch drive apparatus facilitating application of the torch drive apparatus on cutting torches of varying dimensions.

6. Apparatus as set forth in claim 1 wherein said drive wheel further comprises a drive wheel constructed of non-magnetic stainless steel.

7. Apparatus as set forth in claim 1 wherein said drive wheel further comprises a drive wheel mounted and dimensioned to support a cutting torch tip a desired distance above a work surface.

8. Apparatus as set forth in claim 1 wherein said drive wheel further includes an engagement circumference comprising a double beveled drive wheel perimeter which serves as a frictional engagement with said engagement means.

9. Apparatus as set forth in claim 1 wherein said drive wheel further comprises a drive wheel mounting means comprising a drive wheel mounting bracket said drive wheel mounting bracket being substantially flat and further having a drive wheel mounting aperture for receiving a drive rotational mounting means, said rotational drive wheel mounting means comprising a centrally located drive wheel aperture, a shouldered brass bushing dimensioned for receiving said drive wheel aperture, a brass washer disposed upon a bolt and inserted through said drive wheel aperture and said bushing and further securing said drive wheel upon said drive wheel bracket securely in place so that when said bolt is tightened and further dimensioned so that once secured upon said bracket said drive wheel rotates freely about said shouldered brass bushing with drive wheel aperture to brass bushing having from about 0.003 to about 0.015 inch slack, said drive wheel further engaging said engagement means when said drive wheel is urged toward said engagement means.

10. Apparatus as set forth in claim 1 wherein said drive wheel further comprises a means for rotationally and floatingly mounting said drive wheel so that when the drive wheel is urged towards said engagment means said drive wheel engages said engagment means.

11. Apparatus as set forth in claim 1 wherein said drive wheel further comprises a drive wheel mounting means comprising a drive wheel mounting bracket said drive wheel mounting bracket being substantially flat and further having a slotted drive wheel mounting aperture for receiving a floating drive rotational mounting means, said floating rotational drive wheel mounting means comprising a centrally located drive wheel aperture, a double shouldered bushing having a squared trunion dimensioned to be floatingly disposed within said slotted drive wheel mounting aperture and a rounded trunion dimensioned for rotationally receiving said centrally located drive wheel aperture, said drive wheel being sandwiched between said double shouldered bushing and a flat washer and further said drive wheel mounting bracket being sandwiched between said double shouldered bushing and a flat washer, said flats washers and double shouldered bushing being secured inplace by a bolt centrally traveling through said washers and said double shouldered bushing and further said double shoulder bushing square and round trunions being dimensioned so that after said washers and said bushing is secured inplace by said bolt said squared trunion travels freely within said slooted aperture and said drive wheel rotates freely about said rounded trunion while also traveling with said bushing, said drive wheel further engaging said engagement means when said drive wheel is urged toward said engagement means.

12. Apparatus as set forth in claim 1 wherein said means for engaging said drive wheel to said drive motor includes a single drive motor shaft, a drive motor shaft, a means for extending said drive motor shaft, a means for engaging said extendable drive motor shaft means to said drive wheel.

13. Apparatus as set forth in claim 1 wherein said means for engaging said drive wheel to said drive motor further comprises a single drive motor shaft, an extendable shaft having front and back ends said extendable shaft back end having a slotted key way, a drive motor extendable shaft coupler said coupler having front and back ends, said coupler back being secured upon said motor shaft by inserting said motor shaft into a centrally located coupler drive motor bore and securing said drive motor shaft in said bore by use of a set screw, said extendable shaft being slidingly secured to said coupler front by the use of a coupler front extendable shaft bore said bore dimensioned to slidingly receive said extendable shaft back end further said extendable shaft being rotationally secured to said coupler front by the use of key material disposed within said extendable shaft coupler bore said key material engaging said extendable shaft key way so that when said coupler rotates said extendable shaft rotates while said extendable shaft also slides in or out of said coupler.

14. Apparatus as set forth in claim 1 wherein said engagement means further comprises an engagement wheel rotationally coupled to said drive motor by a rotational drive wheel coupling means, said engagement wheel further having an engagement grooved circumference said grooved circumference providing a frictional engagement area to contact said drive wheel so that when said drive wheel is brought into contact with said engagement groove said drive motor rotation is transferred to said drive wheel thereby rotating said drive wheel and driving said cutting torch.

15. Apparatus as set forth in claim 1 wherein said means powering said drive motor comprises a battery.

16. Apparatus as set forth in claim 1 wherein said means powering said drive motor comprises a multiplicity of batteries.

17. Apparatus as set forth in claim 1 wherein said cutting torch drive apparatus further comprises electrical circuitry, said circuitry comprising a means of controlling said drive motor speed, a means for controlling said drive motor rotational direction, a means for controlling said power supply to said drive motor.

18. Apparatus as set forth in claim 1 wherein said cutting torch drive apparatus further comprises electrical circuitry, said circuitry comprising two nine volt batteries, a grounding on/off switch, a high/low switch said high/low switch connecting one nine volt battery to said drive motor on the low position and connecting both said batteries to the drive motor in the high position, a forward/reverse switch which reverses polarity to the drive motor.

19. Apparatus as set forth in claim 1 wherein said cutting torch drive apparatus further comprises electrical circuitry, said circuitry comprising two nine volt batteries, a grounding on/off switch, a means for variable controlling the drive motor speed, a forward/reverse switch which reverses polarity to the drive motor.

20. Apparatus as set forth in claim 19 wherein said a means for variable controlling the drive motor speed further comprises a pulse width modulation control circuitry and a speed control switch.

21. Apparatus as set forth in claim 1 wherein said means mounting said apparatus to a cutting torch with a tip and a neck comprising a means for securing said apparatus upon the cutting torch tip area whereby said drive wheel is positioned to support the cutting torch tip a desired distance above metal to be cut, and a means for attaching the apparatus to the neck of the cutting torch.

22. Apparatus as set forth in claim 1 wherein said means mounting said apparatus to said cutting torch comprises a front torch tip mount and a rear torch neck mount, said front torch tip mount further comprises a substantially flat member with a torch tip receiving aperture dimensioned to receive a threaded torch tip area after the torch tip has been removed from the cutting torch and said torch tip mount being further secured by reinstalling said torch tip upon said cutting torch, said torch tip bracket further having a means for securing said torch tip front bracket to said apparatus, said rear neck bracket being constructed of nonelectrically conducting material and dimensioned as a two part block with a central torch neck receiving aperture, said two parts providing a clamping mounting device further secured around the torch neck with mounting screws.

23. Apparatus as set forth in claim 1 wherein said apparatus mounting means includes a mounting means which allows for mounting the apparatus upon cutting torches of varying dimensions.

24. Apparatus as set forth in claim 22 wherein said means for securing said torch tip front bracket to said apparatus comprises a means for selectively extending said front bracket which thereby results in an overall elongation of the apparatus so that it may be installed upon cutting torches of varying length.

25. Apparatus as set forth in claim 1 further comprising a means for circularly directing said cutting torch and said cutting torch apparatus so that the cutting torch and said cutting apparatus cuts circles.

26. Apparatus as set forth in claim 1 further comprising an attachment means which facilitates circular metal cutting.

27. Apparatus as set forth in claim 26 wherein said cutting torch includes a torch tip and said means for facilitating circular cutting comprises a means for pivoting said cutting torch so that when the torch drive apparatus moves the cutting torch the torch tip moves in an arcing motion parallel with a metal surface to be cut, a means for selectively adjusting the distance from said pivot point to said torch tip.

28. Apparatus as set forth in claim 26 wherein said cutting torch includes a torch tip and said means for facilitating circular cutting comprises a means for pivoting said cutting torch so that when the torch drive apparatus moves the cutting torch the torch tip moves in an arcing motion parallel with a metal surface to be cut, a means for selectively adjusting the radius of the circle formed by said arc, a means for attaching said circular cutting means upon said drive apparatus.

29. Apparatus as set forth in claim 28 wherein said cutting torch is equipped with a gas valve and said drive apparatus includes a drive wheel mounting means located near the torch tip a drive apparatus housing wherein said means for facilitating circular cutting comprises a square stock member having a front end disposed near the torch tip and a rear end disposed near the torch gas valve, further said member being about 1 foot to about 3 feet long, a means for quickly attaching said member front end upon said apparatus drive wheel mounting means, a means for attaching the member upon the drive apparatus housing and further wherein said means for selectively adjusting the radius of the circle formed by said arc comprises a pointed rod mounted upon a carrier, said carrier being disposed upon said square member further said carrier having a locking thumb set screw for securing the carrier in a desired location upon the square member, further said pointed rod extending about ½ to about 3 inches from said carrier and being fixedly attached to said carrier and positioned upon said carrier so that when the cutting torch is place in position for cutting metal the pointed end contacts the metal surface when the cutting torch is substantially parallel to the metal surface and further said pointed rod serving as a pivot point for a circle to be cut.

30. Apparatus as set forth in claim 29 wherein the means for attaching the member upon the drive apparatus housing comprises a clip formed in the shape of a C, said C clip having two ends and said C clip having an inner open area serving as a receiving area for said housing, the ends of the C clip being biased to retain a general C shape so that when the housing is placed in the inner receiving area the clip biased ends hold the clip in place upon the housing, the clip further being disposed upon said square member by use of a mounting trough, said trough being dimensioned to snugly receive said square member, further said trough longitudinal axis lying perpendicular to the C clip when viewing the clip as a C, further said trough being positioned on the perimeter of the C halfway between the clip ends, the square member further being snugly secured within said trough by a retaining strap so that the clip can be slid along the square member with moderate force.

31. Apparatus as set forth in claim 29 wherein the means for quickly attaching said member front end upon said apparatus drive wheel mounting means comprises a coupler mounted on the front end of said square member said coupler being substantially cylindrical in shape and having two open ends and further being about ½ to about 2 inches long, one end of said coupler cylinder being fixedly secured upon said square member front end, the other coupler cylinder end having a substantially square internal dimension forming a square receiving area for a male engaging member, further said square receiving area having an engaging cog internally disposed within said square receiving area said engaging cog dimensioned to engage an indention disposed upon said male engaging member so that when said male engaging member is inserted into said square receiving area said engaging cog engages with said male engaging member indention and further when said rear mounting means is engaged said front mounting engaging members further secure said circle cutter upon said drive wheel mounting means, further said male engaging member being fixedly attached upon said drive wheel mounting means.

32. A cutting torch drive apparatus for attachment upon a gas cutting torch with a cutting torch tip, a cutting torch neck and a gas valve lever, comprising:

a) a battery powered drive motor with a single motor shaft, b) a power supply for powering said motor including a multiplicity of batteries, c) electrical circuitry controlling said motor and said motor power supply, said circuitry including a grounding on/off switch which is positioned to be activated by depressing the cutting torch gas lever, a high and low switch which in the low position provides power from less than all the batteries to the motor and when in the high position provides power from all the batteries to the drive motor, and a reverse and forward switch which switches the polarity of the electrical power to the drive motor facilitating motor direction change, d) a cylindrical body housing with a front and back end, said front body housing having a circular plate fixedly attached forming a body housing cavity for receiving said motor, batteries, and electrical circuitry, said circular plate further having a centrally located threaded aperture, said body cavity being further sealed with a circular back plate which is secured in place upon said housing back by screws extending from said body housing front through the body housing cavity to the body housing back plate, said cylindrical body housing further providing a user accessible mounting means for said high/low switch and said reverse/forward switch, said cylindrical body housing further providing a mounting means for mounting said drive apparatus upon a neck of said cutting torch, e) a cylindrical housing having front and back ends, the back end being male threaded for disposition upon the front plate centrally located threaded aperture, an extendable cylindrical housing having front and back ends, said extendable housing further having an internal diameter to receive said cylindrical housing front end upon said extendable housing back end, said extendable housing back end further having a compression nut disposed for compressingly securing said extendable housing upon said cylindrical housing back in a desired position, said cylindrical extendable housing front further having an enlarged area for internally receiving an extendable shaft bearing in addition to a shoulder area for pressingly receiving a drive wheel bracket, f) a drive motor shaft coupler having front and back ends, the back end fixedly receiving said motor shaft and the front end with a centrally disposed extendable shaft receiving area slidingly receiving an extendable shaft wherein said extendable shaft is also engagingly received by said coupler by the use of an extensible shaft key way which engages coupler key material disposed within said centrally disposed extendable shaft receiving area, said extendable shaft, drive motor shaft coupler, and extendable shaft being disposed within said cylindrical housing and said cylindrical extendable housing, said extendable shaft front end further extending beyond said extendable housing from said extendable shaft bearing providing a mounting shaft for an engagement wheel pressingly mounted upon said extendable shaft front, said engagement wheel having an engagement groove around its circumference said engagement groove being dimensioned as a V, g) said drive wheel bracket providing an aperture for mounting a drive wheel said aperture being positioned and said drive wheel and said engagement wheel dimensioned so that once the drive wheel is mounted said drive wheel supports the cutting torch tip a proper distance from the work metal and also provides a proper drive speed for the torch tip and work thickness, said drive wheel further having an engagement area around its circumference which engages with the engagement wheel engagement area, further providing a rotationally mounting means which is secured to said drive wheel bracket aperture said rotational mounting means further providing rotational movement of said drive wheel with a predetermined amount of slack between the drive wheel and drive wheel mounting means so that the drive wheel engagement area engages the engagement wheel engaging area when the drive wheel is urged toward the engagement wheel, h) a front mount mounted to said drive wheel bracket, said front mount having a cutting torch tip receiving aperture, said torch tip receiving aperture dimensioned to receive a cutting torch tip threaded area once the cutting torch tip has been removed from the cutting torch and said front bracket further being secured by installing the cutting torch tip upon the cutting torch, further providing a means for securing said front mount to drive wheel bracket, i) said cylindrical body housing mounting means for mounting said drive apparatus upon a neck of said cutting torch further comprising a multiplicity of mounting projections extending from said cylindrical body housing exterior, a non-electrical conducting mounting block, said mounting block having a cutting torch neck receiving aperture and further said mounting block being split forming top and bottom mounting block halves facilitating a clamping mounting means around said cutting torch neck, said top mounting block providing a means for mounting said on/off grounding switch and further positioning said on/off grounding switch to be contacted by said cutting torch gas valve lever.

33. Apparatus as set forth in claim 32 wherein said means for securing said torch tip front bracket to said apparatus comprises a means for selectively extending said front bracket which thereby results in an overall elongation of the apparatus so that it may be installed upon cutting torches of varying length.

34. Apparatus as set forth in claim 32 further comprising a means for circularly directing said cutting torch and said cutting torch apparatus so that the cutting torch and said cutting apparatus cuts circles.

35. Apparatus as set forth in claim 32 further comprising an attachment means which facilitates circular metal cutting.

36. Apparatus as set forth in claim 32 wherein said cutting torch includes a torch tip and said means for facilitating circular cutting comprises a means for pivoting said cutting torch so that when the torch drive apparatus moves the cutting torch the torch tip moves in an arcing motion parallel with a metal surface to be cut, a means for selectively adjusting the distance from said pivot point to said torch tip.

37. Apparatus as set forth in claim 32 wherein said cutting torch includes a torch tip and said means for facilitating circular cutting comprises a means for pivoting said cutting torch so that when the torch drive apparatus moves the cutting torch the torch tip moves in an arcing motion parallel with a metal surface to be cut, a means for selectively adjusting the radius of the circle formed by said arc, a means for attaching said circular cutting means upon said drive apparatus.

38. Apparatus as set forth in claim 32 wherein said cutting torch is equipped with a gas valve and said drive apparatus includes a drive wheel mounting means located near the torch tip a drive apparatus housing wherein said means for facilitating circular cutting comprises a square stock member having a front end disposed near the torch tip and a rear end disposed near the torch gas valve, further said member being about 1 foot to about 3 feet long, a means for quickly attaching said member front end upon said apparatus drive wheel mounting means, a means for attaching the member upon the drive apparatus housing and further wherein said means for selectively adjusting the radius of the circle formed by said arc comprises a pointed rod mounted upon a carrier, said carrier being disposed upon said square member further said carrier having a locking thumb set screw for securing the carrier in a desired location upon the square member, further said pointed rod extending about ½ to about 3 inches from said carrier and being fixedly attached to said carrier and positioned upon said carrier so that when the cutting torch is place in position for cutting metal the pointed end contacts the metal surface when the cutting torch is substantially parallel to the metal surface and further said pointed rod serving as a pivot point for a circle to be cut.

39. Apparatus as set forth in claim 32 wherein the means for attaching the member upon the drive apparatus housing comprises a clip formed in the shape of a C, said C clip having two ends and said C clip having an inner open area serving as a receiving area for said housing, the ends of the C clip being biased to retain a general C shape so that when the housing is placed in the inner receiving area the clip biased ends hold the clip in place upon the housing, the clip further being disposed upon said square member by use of a mounting trough, said trough being dimensioned to snugly receive said square member, further said trough longitudinal axis lying perpendicular to the C clip when viewing the clip as a C, further said trough being positioned on the perimeter of the C halfway between the clip ends, the square member further being snugly secured within said trough by a retaining strap so that the clip can be slid along the square member with moderate force.

40. Apparatus as set forth in claim 32 wherein the means for quickly attaching said member front end upon said apparatus drive wheel mounting means comprises a coupler mounted on the front end of said square member said coupler being substantially cylindrical in shape and having two open ends and further being about ½ to about 2 inches long, one end of said coupler cylinder being fixedly secured upon said square member front end, the other coupler cylinder end having a substantially square internal dimension forming a square receiving area for a male engaging member, further said square receiving area having an engaging cog internally disposed within said square receiving area said engaging cog dimensioned to engage an indention disposed upon said male engaging member so that when said male engaging member is inserted into said square receiving area said engaging cog engages with said male engaging member indention and further when said rear mounting means is engaged said front mounting engaging members further secure said circle cutter upon said drive wheel mounting means, further said male engaging member being fixedly attached upon said drive wheel mounting means.

41. Apparatus as set forth in claim 32 wherein said drive motor includes a 10 to 16 volt direct current motor.

42. Apparatus as set forth in claim 32 wherein said drive motor includes a 2.0 to 15.0 milliampere motor.

* * * * *